J. E. ROTHWELL & H. B. LOWDEN.
LEACHING ORES AND OTHER PRODUCTS.
APPLICATION FILED JUNE 3, 1912.
1,205,936.  Patented Nov. 21, 1916.
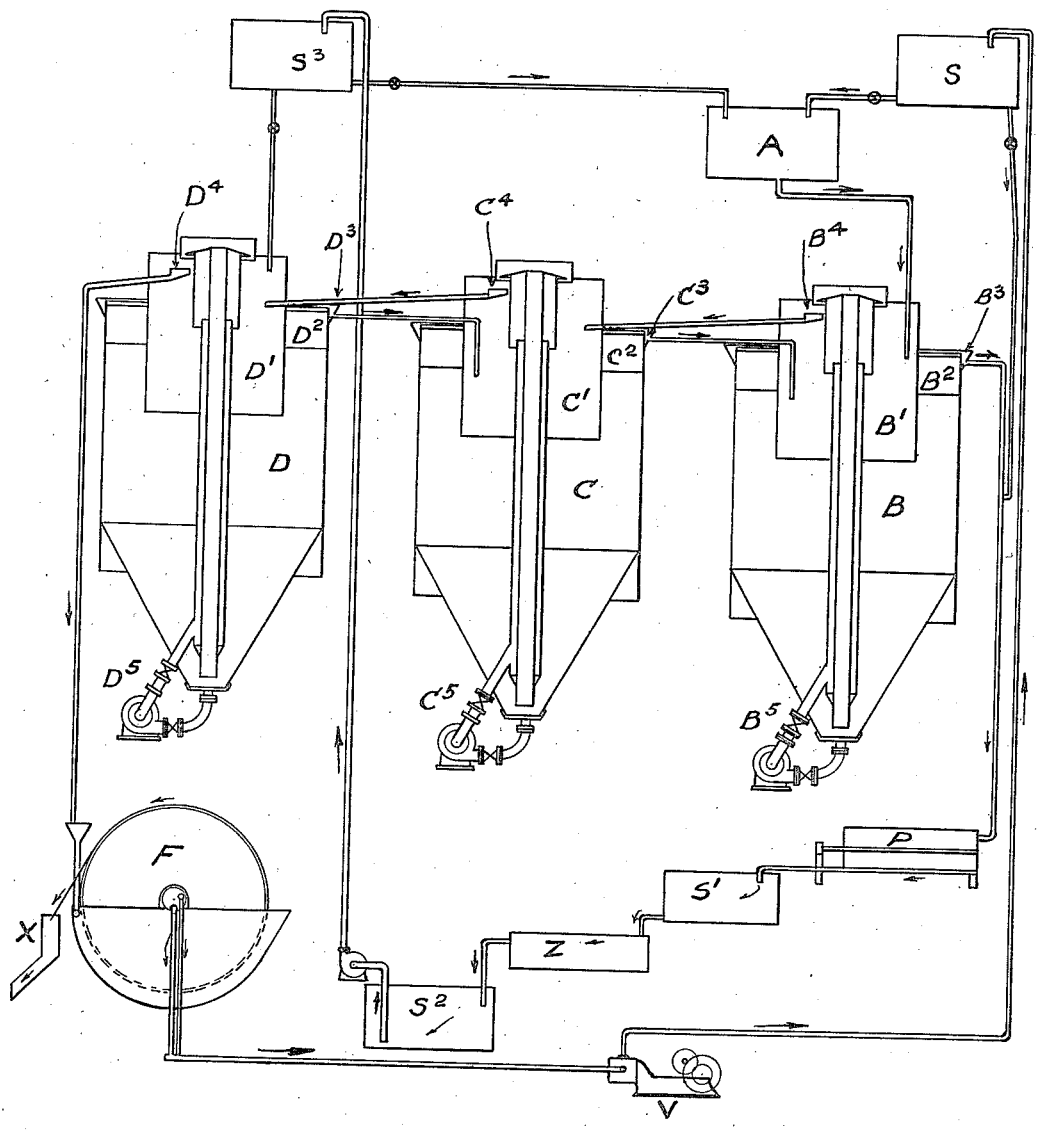

UNITED STATES PATENT OFFICE.

JOHN EDWARD ROTHWELL AND HUGH BLACKIE LOWDEN, OF DENVER, COLORADO, ASSIGNORS TO COLORADO IRON WORKS COMPANY, OF DENVER, COLORADO, A CORPORATION OF MAINE.

LEACHING ORES AND OTHER PRODUCTS.

1,205,936.  Specification of Letters Patent.  Patented Nov. 21, 1916.

Application filed June 3, 1912. Serial No. 701,282.

*To all whom it may concern:*

Be it known that we, JOHN EDWARD ROTHWELL, a subject of the King of Great Britain, and HUGH BLACKIE LOWDEN, a citizen of the United States, both residing at Denver, Colorado, have invented certain new and useful Improvements in Leaching Ores and other Products, of which the following is a specification.

Our invention relates to an improved method of agitating solid matter with a solvent and is particularly suited to the treatment of ore pulps for the recovery of their metal values. It is conveniently combined with means for the separation of the pregnant solution from the exhausted solids and recovery therefrom of the valuable content, the whole operation being conducted in a continuous manner.

In this invention the crushed solid is fed to the first of a series of agitation tanks preferably of a construction similar to that shown in Letters Patent of the United States No. 951742 granted to Randall P. Akins and John E. Rothwell and dated March 8, 1910. The method of continuous agitation contemplated in the patent referred to was one in which the ore and solvent traveled together through a series of tanks, while the present method consists in passing the solids and solvent through a series of tanks in opposite directions. The reduction to practice of continuous agitation by means of a series of tanks arranged as contemplated in the patent referred to has shown that the results can be greatly improved if, instead of passing solids and solvent from tank to tank together, the decanting filter or any device for obtaining a substantially clear solution is used to continuously remove clear liquid from the tanks, the liquid being passed from tank to tank but in a direction contrary to that in which the solids travel. The valuable solution is thus drawn from the first tank of the series and the exhausted solids from the last. In this method the richest material is in contact with the solvent containing the maximum value and the material when nearly exhausted is in contact with practically barren solvent so that the solvent effect is greatest where there is little of value to be dissolved and least where the material is richest and consequently has the greatest tendency to dissolve.

In the aforementioned Letters Patent a decanting filter is described and this filter would serve to separate the solid from the liquid, the liquid being passed to the next or one of the tanks ahead of it in the series. In actual practice, however, it is not essential that the counter current of solution should be absolutely clear, and, as filters have the objection of becoming clogged in use a more practical method of separating the solids from the liquid has been devised that is efficient and at the same time avoids the trouble due to clogging.

This improvement, when applied to a round tank, consists of a cylindrical diaphragm or partition open at top and bottom placed concentric with the curb of the tank and supported so that its top extends above the surface of the contents of the tank. Radially across the annular space thus formed is placed a series of plates having their top edges horizontal and submerged, and their surfaces inclined at an angle of 70° more or less from the horizontal. These inclined plates accelerate the settlement of the solids and thus effect an increase in the settling capacity of the annular space, having the same function as the same type of inclined plates described in Letters Patent of the United States No. 976,923, granted to John E. Rothwell and dated November 29, 1910.

The top edge of the main tank constitutes an overflow weir and a launder surrounding this collects the overflow from which it flows to the tank ahead in the series. The initial inflow to the last tank when properly regulated gives an overflow from each of the different tanks sufficiently clear for the purpose of practising this method.

Thickening tanks such as described in the patent last above referred to, interposed between the agitation tanks, or a settling cone exterior to each agitation tank with the bottom of the cone so connected to the side of the agitation tank as to return the settled solids to it could be used to obtain the clear liquid but the arrangement of an undisturbed annular space in the agitation tank is selected as the simplest and most satisfactory.

The apparatus and equipment employed to carry out this method as applied to the extraction of gold and silver from ores by cyanid solution is diagrammatically shown in the drawing forming part of this specification.

In the drawing, A represents the grinding mill or the receptacle in which the finely ground ore is collected from the grinding mill; B, C, D are the agitation tanks arranged in series; $B^1$, $C^1$, $D^1$ show the cylindrical partitions or diaphragms; $B^2$, $C^2$, $D^2$ are the annular settling spaces fitted with the inclined baffles not shown; $B^3$, $C^3$, $D^3$ are the launders for collecting the overflow; $B^4$, $C^4$, $D^4$ are the adjustable cutting vanes for passing the pulp from one tank to the other in definite quantity continuously; $B^5$, $C^5$, $D^5$ indicate centrifugal pumps for agitating the tank of pulp; F is a rotary continuous slime filter; V indicates a vacuum pump; S is a solution tank for the filtrate from the rotary filter; P is a clarifying filter press; $S^1$ indicates a solution tank for pregnant solution; Z is a zinc box for precipitation of the gold and silver from the pregnant solution; $S^2$ is a tank for barren solution; $S^3$ is a solution storage tank from which a definite quantity of barren solution is run to make up the counter current and from which any excess flows to the grinding mill; X is a waste launder for final disposal of the tailings.

In operation, the ore to be treated is reduced by any well known means in the grinding mill A and mixed in the proper proportion with the cyanid solution, passing thence to the inner space $B^1$ in which it is kept in a state of agitation by the centrifugal pump, $B^5$ or, when necessary, by a jet of air as in ordinary pneumatic agitation tanks. The amount of the counter current flow coming from the tank C equals the amount of overflow of pregnant solution going from $B^3$ to the clarifying press P, to remove any turbidity, thence to pregnant solution tank $S^1$, from which it passes through the zinc box or boxes, Z, in which the gold and silver are precipitated and recovered. The barren solution from the zinc box Z, goes to $S^2$ from which it is transferred to tank $S^3$ and thence into the mill circuit and to form the counter current entering tank D from which it flows successively to C and B. The solids carried in liquid pass in regulated quantity through the cutting vane $B^4$ to the inner cylinder $C^1$, thence through the cutting vane $C^4$ to the inner cylinder $D^1$ of tank D and from thence through cutting vane $D^4$ to continuous slime filter F, where the solids are separated from the solution, washed to recover adhering values and delivered to waste launder X. The solution drawn through the filter F, passes through the vacuum pump V, to the solution tank S, from which it is run to the clarifying press P, or into the mill circuit A, as the control of the process may demand.

The adjustability of the cutting vanes $B^4$, $C^4$, $D^4$, together with the size and number of tanks in the series forms the means for providing any time of treatment of the solids and the initial feed of barren solution to $B^1$ determines the rate of overflow of clear solution from the several tanks and the amount drawn for precipitation. All factors influencing the control of the process are therefore susceptible of easy regulation.

It is well known that a solvent, as it approaches a state of saturation has less solvent effect than when barren or nearly so and that it is difficult to get a saturated or very strong solution economically. In the leaching of copper ores it is desirable to exhaust the pulp of its contained metal and is necessary to obtain a strong solution for precipitation. Both of these results have been difficult to obtain by methods heretofore practised but are easy of accomplishment by our method.

What we claim as our invention is:—

A method of continuous leaching consisting in actively agitating a mixture of solids and solvent in a suitable vessel, continuously withdrawing solids with a portion of the liquid directly from said vessel while it is undergoing such agitation and passing the same to a following vessel, and at the same time continuously passing a substantially clear solution directly from said first named vessel to a preceding vessel.

In testimony whereof, we affix our signatures in presence of two witnesses.

JOHN EDWARD ROTHWELL.
HUGH BLACKIE LOWDEN.

Witnesses:
FRANCIS B. HOWLAND,
LEON E. HOFFMAN.